United States Patent
Wunning (10) Patent No.: US 6,606,969 B2
(45) Date of Patent: Aug. 19, 2003

(54) TUBULAR OVEN

(75) Inventor: Joachim G. Wunning, Leonberg (DE)

(73) Assignee: WSOWarmeprozesstechnik GmbH (DE)

(*) Notice: Subject to any disclaimer, the term of this patent is extended or adjusted under 35 U.S.C. 154(b) by 0 days.

(21) Appl. No.: 10/181,245

(22) PCT Filed: Jan. 11, 2001

(86) PCT No.: PCT/DE01/00076
§ 371 (c)(1),
(2), (4) Date: Sep. 25, 2002

(87) PCT Pub. No.: WO01/51867
PCT Pub. Date: Jul. 19, 2001

(65) Prior Publication Data
US 2003/0037736 A1 Feb. 27, 2003

(30) Foreign Application Priority Data
Jan. 14, 2000 (DE) .......................... 100 01 293

(51) Int. Cl.[7] .............................................. F22B 23/06
(52) U.S. Cl. .............................. 122/235.13; 122/367.1; 110/347
(58) Field of Search ................ 122/44.1, 511, 122/114, 4 D, 7 R, 1 B, 1 C, 406.1, 406.4, 367.1, 235.13, 20 B; 110/325, 345, 347

(56) References Cited

U.S. PATENT DOCUMENTS

| 2,660,996 | A |   | 7/1953 | Wasp |
| 2,752,897 | A |   | 2/1956 | Mekler |
| 3,675,629 | A | * | 7/1972 | Stevens ................. 122/235.11 |
| 3,892,191 | A | * | 7/1975 | Welden et al. ............... 110/205 |
| 4,453,498 | A | * | 6/1984 | Juhasz ..................... 122/136 R |
| 5,915,468 | A | * | 6/1999 | Inoue et al. ............. 165/134.1 |
| 6,116,196 | A | * | 9/2000 | Watanabe et al. ...... 122/235.11 |

FOREIGN PATENT DOCUMENTS

| EP | 0079 980 A | 6/1983 |
| GB | 665865 A | 11/1952 |
| GB | 988 275 A | 4/1965 |
| GB | 1 037 094 A | 7/1966 |

* cited by examiner

Primary Examiner—Gregory A. Wilson
(74) Attorney, Agent, or Firm—Leydig, Voit & Mayer, Ltd.

(57) ABSTRACT

A thermal processing plant having heating tubes that are arranged in a zigzag or undulating line in an oven chamber. Burners generate a gas stream which is directed against a wall of the oven opposite the wall in which the burners are positioned. The burners direct a gas stream at each of the wave or zigzag crests and in each of the wave or zigzag troughs. The thermal radiation of the oven wall and of the reaction zone (combustion heat) heats the heating tubes uniformly.

9 Claims, 7 Drawing Sheets

TUBULAR OVEN

FIELD OF THE INVENTION

The present invention relates generally to heating systems, and more particularly, to thermal processing plants in which streams of fluids or other products are heated indirectly in guide tubes.

BACKGROUND OF THE INVENTION

In thermal processing plants, fluids that are often under pressure are indirectly heated, wherein thermal energy is used for heating, a phase change, as reaction heat (endothermic reaction), or for several of these effects. The fluids are guided in heating tubes that are usually heated to their thermal limit. In this way, there are no local points of overheating.

Figure 7:
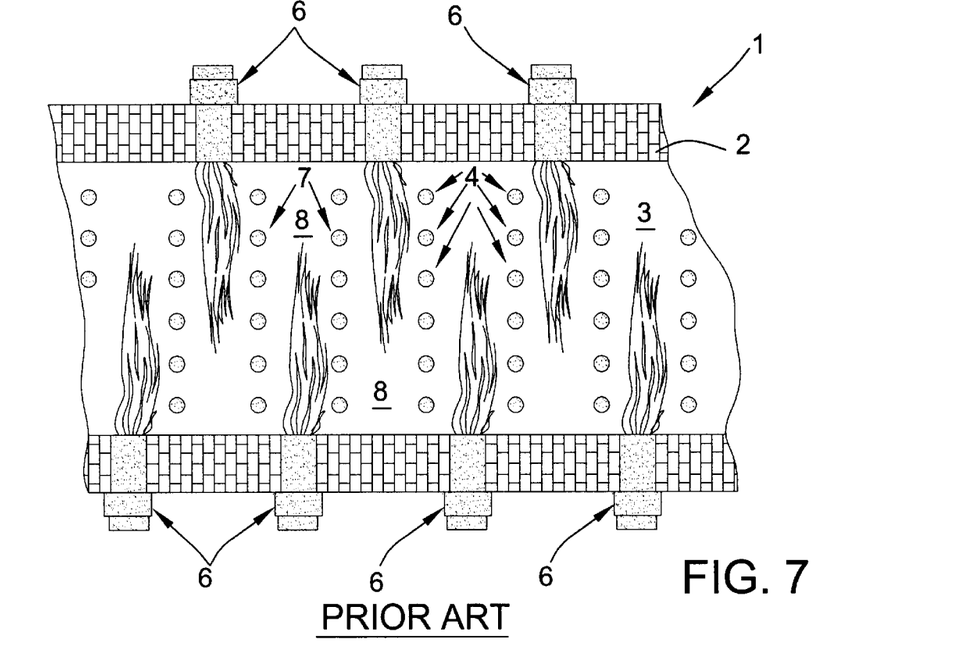
FIGS. 7 and 8 disclose thermal processing plants according to the prior art.
Figure 8:
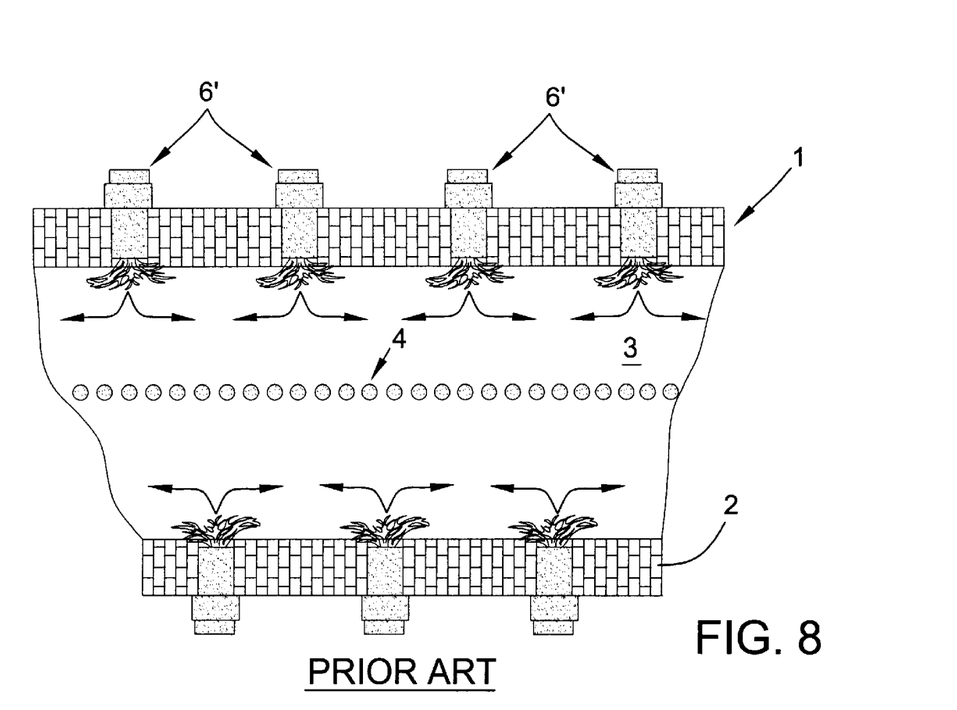

Thermal processing plants 1 of the type illustrated in FIGS. 7 and 8 are known in the art. The thermal processing plants 1 each has an interior space enclosed by an oven wall 2, e.g., made from bricks, in which heating tubes 4 are arranged. For heating these tubes, burners 6 are positioned in openings in the oven wall 2. In the embodiment according to FIG. 7, the heating tubes 4 are arranged in line vertically and one after the other, so that an alley 8 is formed between pairs of tube lines 7. The burners 6 impart an axial output momentum to the fuel and to the air and fire into the alleys 8, wherein the heat is transferred predominantly through flame and gas radiation to the heating tubes 4. The radiation originating from the oven wall 2 meets the heating tubes 4 non-uniformly. This arrangement results in a relatively minimal heat transfer effect. In addition, this arrangement is not suitable for the use with flameless-oxidation burners, which form relatively large areas of reducing atmosphere that is harmful to the heating tubes 4.

Thermal processing plants 1 that are known from practice are illustrated in FIGS. 7 and 8. The thermal processing plants 1 each have an interior space enclosed by an oven wall 2, e.g., made from bricks, in which heating tubes 4 are arranged. For heating these tubes, burners 6 are positioned in openings in the oven wall 2. In the embodiment according to FIG. 7, the heating tubes 4 are arranged in line vertically and one after the other, so that an alley 8 is formed between pairs of tube lines 7. The burners 6 impart an axial output momentum to the fuel and to the air and fire into the alleys 8, wherein the heat is transferred predominantly through flame and gas radiation to the heating tubes 4. The radiation originating from the oven wall 2 meets the heating tubes 4 non-uniformly.

This results in a relatively minimal heat transfer effect. In addition, this arrangement is not suitable for the use of flameless-oxidation burners, which form relatively large areas of reducing atmosphere that is harmful to the heating tubes 4.

With the thermal processing plant 1 according to FIG. 8, the heating tubes 4 are arranged in a line approximately in the center of the interior space 3. Swirl burners 6' are positioned in openings in the oven wall 2 and they impart an essentially radial output momentum to the fuel and to the supplied combustion air. The flames and heated regions of the oven wall 2 generate a hot spot that transfers the major portion of the energy from the flame to the heating tubes 4 through radiation. The zones of higher radiation intensity are small, and for this reason, a plurality of swirl burners 6' must be installed.

OBJECTS AND SUMMARY OF THE INVENTION

It is an object of the present invention to provide a thermal processing heating system that allows for uniform tube heating while preventing points of overheating in the tubes.

Another object is to provide a thermal processing heating system as characterized above which is compact in design.

Through the arrangement of burners and heating tubes according to the present invention, the burners generate a large zone of increased temperature at the opposite wall and this zone is in radiation exchange with the heating tubes with no shadow formation. The energy is transferred uniformly through solid body radiation (wall-to-tube), gas radiation (reaction zone-to-tube), and convection (completely reacted combustion products-to-tube).

The burners preferably impart a large axial output momentum to the output fuel-air stream. Preferably, this momentum is so large that the stream reaches the opposite wall and generates a hot spot/region at that location. The burners can have fuel-air-mixed output openings or separate output openings for the fuel and air. This releases radiation heat to the heating tubes.

If burners that operate according to the principle of flameless oxidation are used, then no temperature spikes are formed near the burner so that tube line sections opposite in angle can be assembled relatively close in front of the burner. The large-area recirculation of the combustion gases enables, particularly for flameless oxidation, an optimum reduction of the $NO_x$ emission even for highest pre-warming of the air. Relatively large, self-forming reducing areas do not contact the heating tubes due to the tube arrangement. In addition, the tube arrangement enables a compact construction and high heat-transfer effects without temperature spikes at the heating tubes. In addition, burners suitable for flameless oxidation also allow the use of problematic fuels or compositions of changing fuels that would conventionally result in stability problems for the formation of a flame.

Other objects and advantages of the invention will become apparent upon reading the following detailed description and upon reference to the drawings, in which:

While the invention is susceptible of various modifications and alternative constructions, a certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENT

Figure 1:
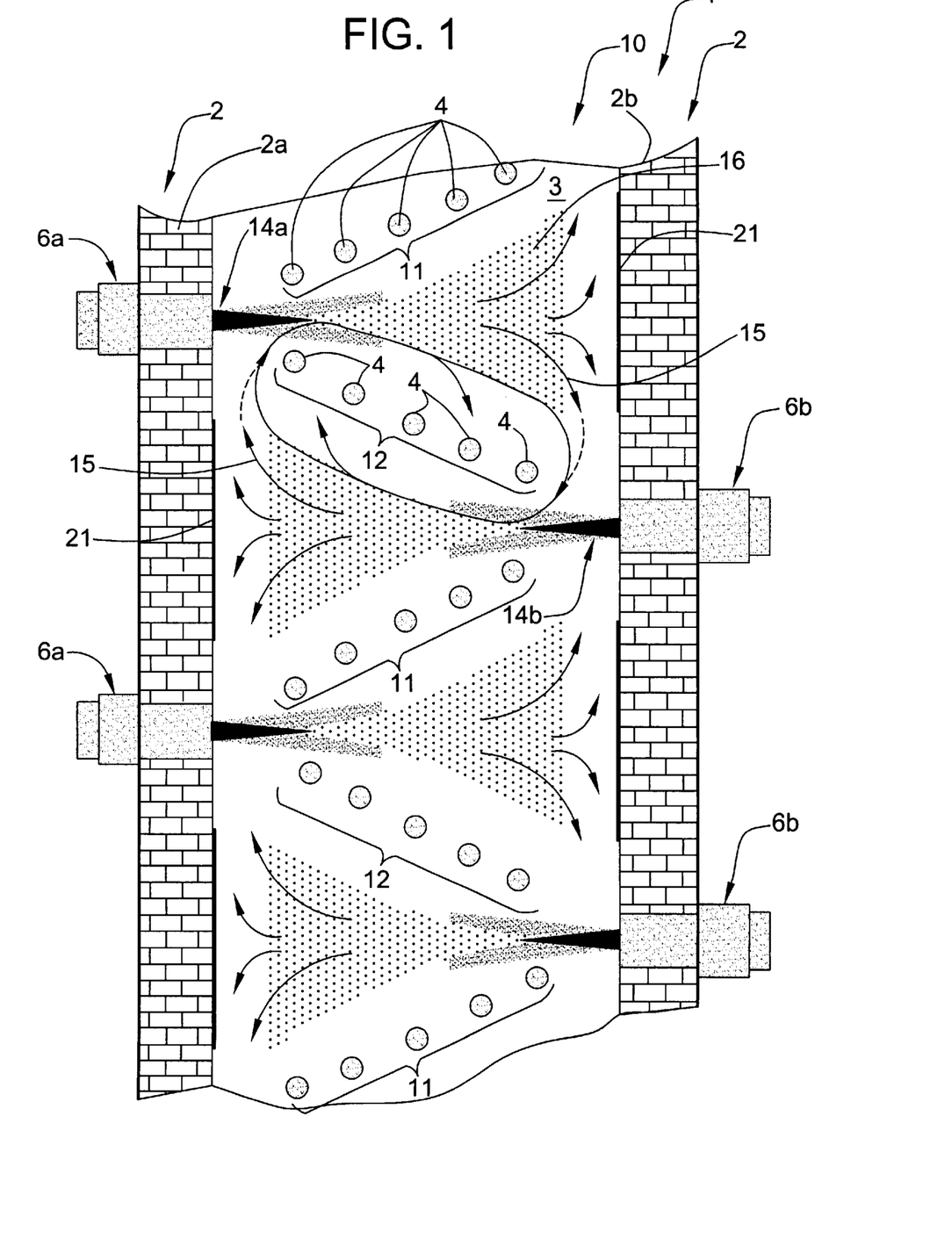
FIG. 1 is a partially diagrammatic, horizontal section of a thermal processing plant having burners and heating tubes arranged in accordance with the present invention.

Referring now more particularly to FIG. 1 of the drawings, there is shown an illustrative processing plant 1 in accordance with the present invention. The illustrated processing plant has oven walls 2, respectively designated 2a, 2b, that are built from bricks and define an oven chamber 3. In the oven chamber 3 there are heating tubes 4 which carry a fluid for heating and for maintaining a high temperature. In this way, the fluid can be subjected to chemical changes along its path through the heating tubes 4.

In accordance with one aspect of the invention, the heating tubes 4 have parallel axes and are arranged at intervals from each other in a zigzag line, as depicted in FIG. 1. In this way, groups 11, 12 of the heating tubes 4 define lines that are not parallel to each other and which form acute angles, such as between about 30 and 80°. The angles formed by the lines 11, 12 open in an alternating way towards one and then towards the other of the two opposite oven walls 2a, 2b. In the embodiment illustrated in FIG. 1, lines or sections of tubes formed by the groups 11, 12 are straight, with the lines 11 of the heating tubes being straight and parallel to each other and with the lines 12 if the heating tubes being straight and parallel to each other. While in the illustrated embodiment the groups 11 and 12 of heating tubes define straight lines, it will be understood that the line sections of the groups 11, 12 of the heating tubes can be curved or undulating.

For heating the tubes 4 burners 6a, 6b are positioned in corresponding openings of the oven walls 2a and 2b, respectively. In the embodiment according to FIG. 1, the burners 6a, 6b preferably are burners that are operable for flameless oxidation. They generate a fuel-air stream, i.e., a flow 14a, 14b with axial output momentum that is directed against the corresponding opposite oven wall 2b, 2a. At the burner outlet, the stabilization of the flame is prevented by means of appropriate design according to known flow technology.

The flow 14a, 14b output from the burners 6a, 6b is located between two adjacent heating tubes 4, where one tube belongs to group 11 and the other tube belongs to group 12. In such arrangement, a large-area recirculation flow is formed as illustrated in FIG. 1 by arrow 15, wherein a large-area reaction zone 16 is produced between the line sections of the groups 11, 12.

Figure 6:
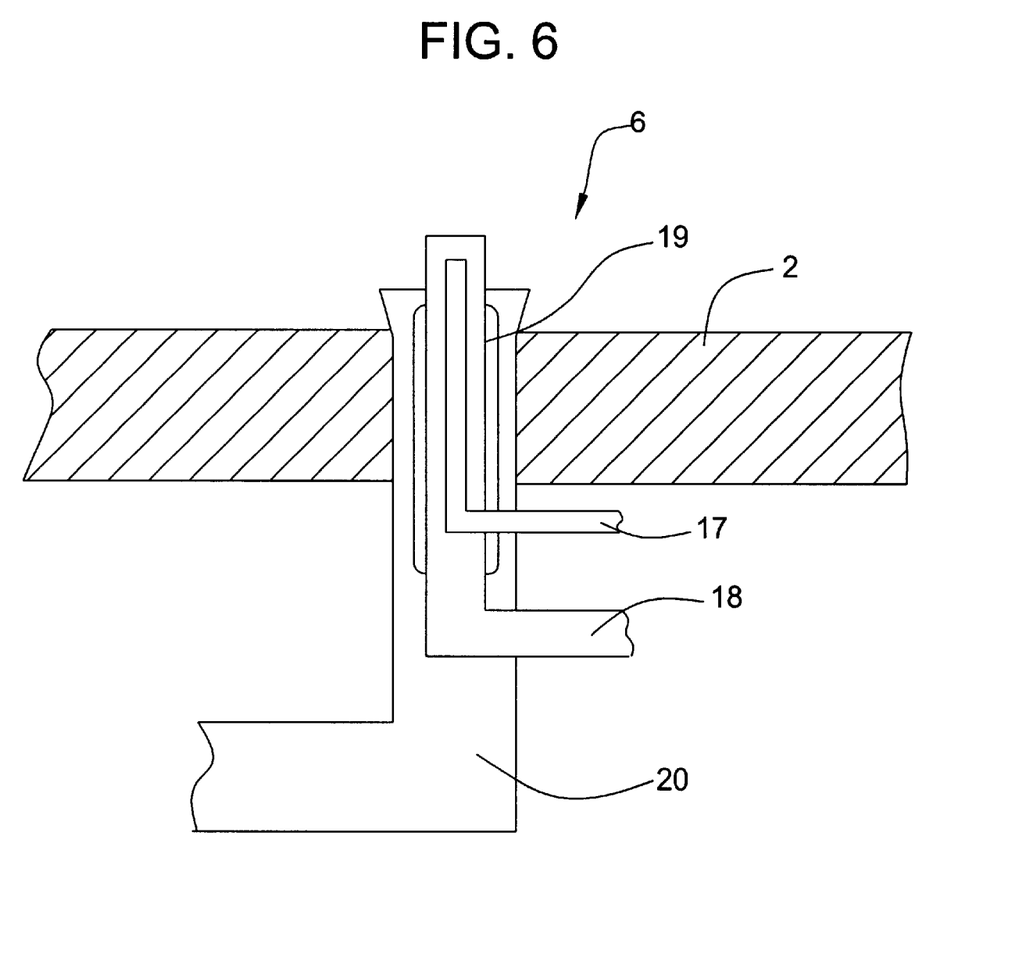
FIG. 6 is a partially diagrammatic fragmentary section of one of the burners of the illustrated thermal processing plant.

The burners 6a, 6b may be recuperator burners or regenerator burners of a known type that permit high air prewarming. As an example, a principle schematic of a recuperator burner 6 is shown in FIG. 6. This burner has a central fuel supply line 17 that can direct fuel with axial output momentum. In addition, the burner 6 has an air supply 18 that likewise imparts axial output momentum to the output combustion air. The air supply 18 is in heat exchange via a recuperator tube 19 with an exhaust stream that is guided in the opposite direction over an exhaust line 20 out of the oven chamber. The recuperator tube 19 is a heat exchanger. Through the discharge of exhaust gasses through the burner 6, temperature regulation zones are minimally influenced on opposite sides.

Figure 3:
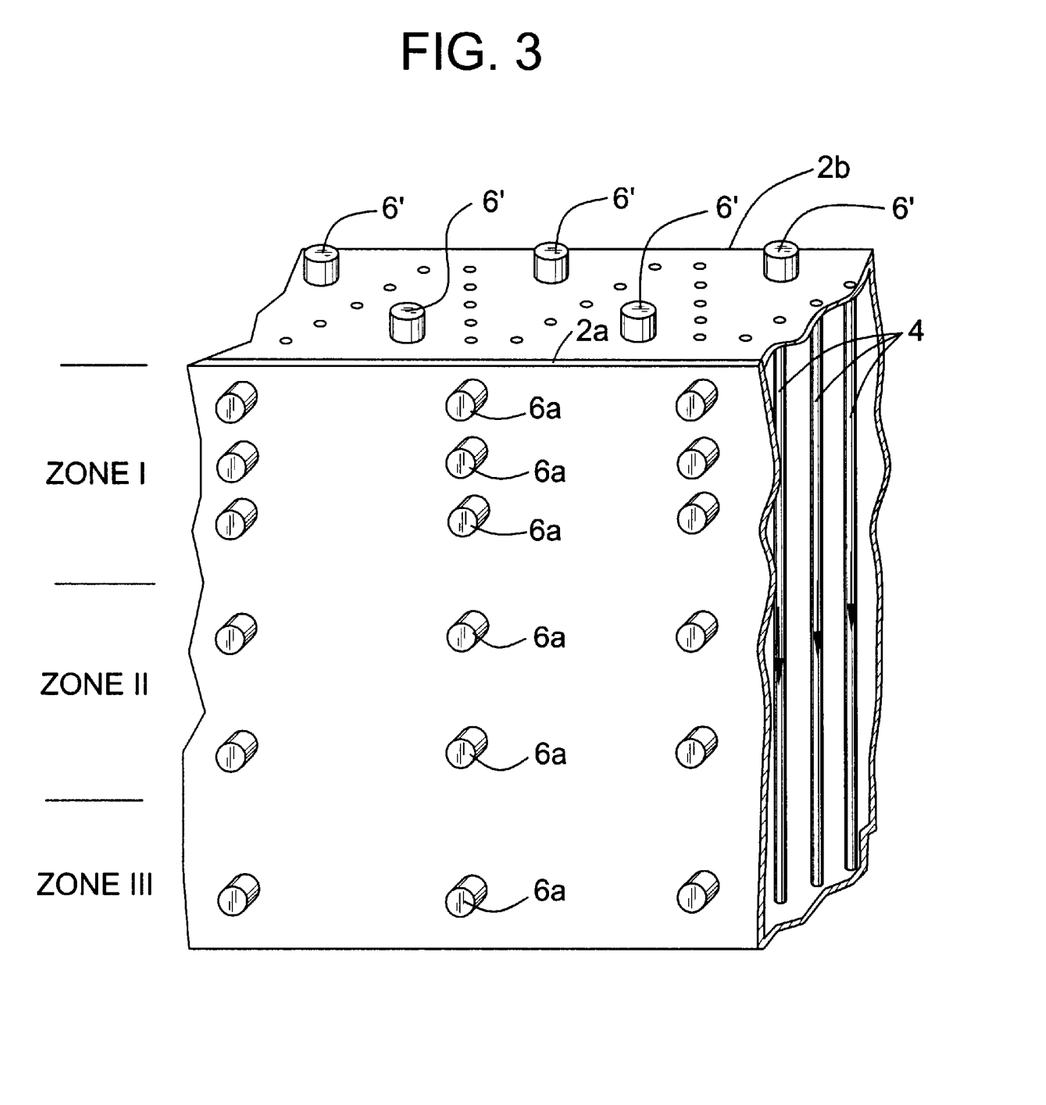
FIG. 3 is schematic fragmentary perspective of the burner and heating tube arrangement of a thermal processing plant, such as depicted in FIGS. 1 or 2.

As FIG. 3 illustrates, several burners 6 can be arranged in a line on each oven wall 2a, 2b, wherein the burners 6 (designated 6a, 6b for the respective wall in which they are mounted) each generate output momentum directed perpendicular to the heating tubes 4 and are arranged in groups in lines that are parallel to the heating tubes 4. The burners 6a can be arranged at uniform intervals or at different intervals. For example, for a downward-directed fluid stream there can be a higher number of burners (burner density) in a first zone in order to heat the input fluid stream quickly at first, wherein in subsequent zones 2, 3 a correspondingly fewer number of burners 6 is sufficient in order to maintain the achieved temperature.

There can be additional burners 6' that are directed parallel to the heating tubes 4 and thus impart output momentum directed parallel to these heating tubes 4. These burners are preferably positioned in a zigzag arrangement above or below, respectively, the approximately triangular areas 16 of the oven chamber 3 defined by the groups 11, 12 (FIG. 1). They can be used at the startup of the plant, e.g., for initial heating, in which they fire parallel to the heating tubes 4 and later are turned off, switched to flameless oxidation, or operated further. In one preferred embodiment, the burners 6' are equipped with flame retention baffles and they generate a flame, while the burners 6a, 6b are burners without flame retention baffles and they are suitable for flameless oxidation and are turned on, e.g., first in the heated state. If necessary, however, the burners 6a, can also be changeable burners that operate at first with flames for ignition and when the required temperature is reached, switch to flameless operation.

The thermal processing plant 1 described above operates as follows:

In operation, the burners 6a, 6b release a fuel-air stream that is directed towards the opposite oven wall 2b, 2a perpendicular to the heating tubes 4. The stream passes between adjacent heating tubes 4 and reaches the oxidation zones 16, where flameless oxidation occurs. The heat released here is led with the gas flow to the oven wall 2b, 2a, where a corresponding, strongly heated area 21 is formed. The heat radiation output from this region 21, and also the heat radiation output from the oxidation region 16, meets the heating tubes 4 without shadowing. The heat distribution is relatively uniform, i.e., all heating tubes 4 obtain approximately the same amount of heat.

By means of the alternating, oppositely directed momentum from the burners 6a, 6b there results a large-area circulation, as indicated by the arrow 15. The large-area recirculation includes the heating tubes 4 of each group 11, 12, which achieves a uniform, convective heat transfer. The heating tubes 4 lie outside the oxidation zones 16, where the reducing atmosphere prevails, which counteracts corresponding tube wear and tear.

With the embodiment illustrated in FIG. 1, the heating tubes 4 are generally positioned relative to each other at equal intervals. By means of the number of heating tubes, their intervals, and the angles formed by the sections or lines of the groups 11, 12 with each other, the heat distribution on the heating tubes 4 can be selectively influenced. By means of the angle, the number, and the interval of the heating tubes, the relationship of the area of the oven wall 2 to the tube surface can be determined, where the preferred goal is approximate uniformity between surface area of the tube and of the oven wall. The burners 6 can preferably be adjusted and turned on and off individually. In this way, the heat distribution in the oven chamber 3 can be additionally selectively influenced.

Figure 2:
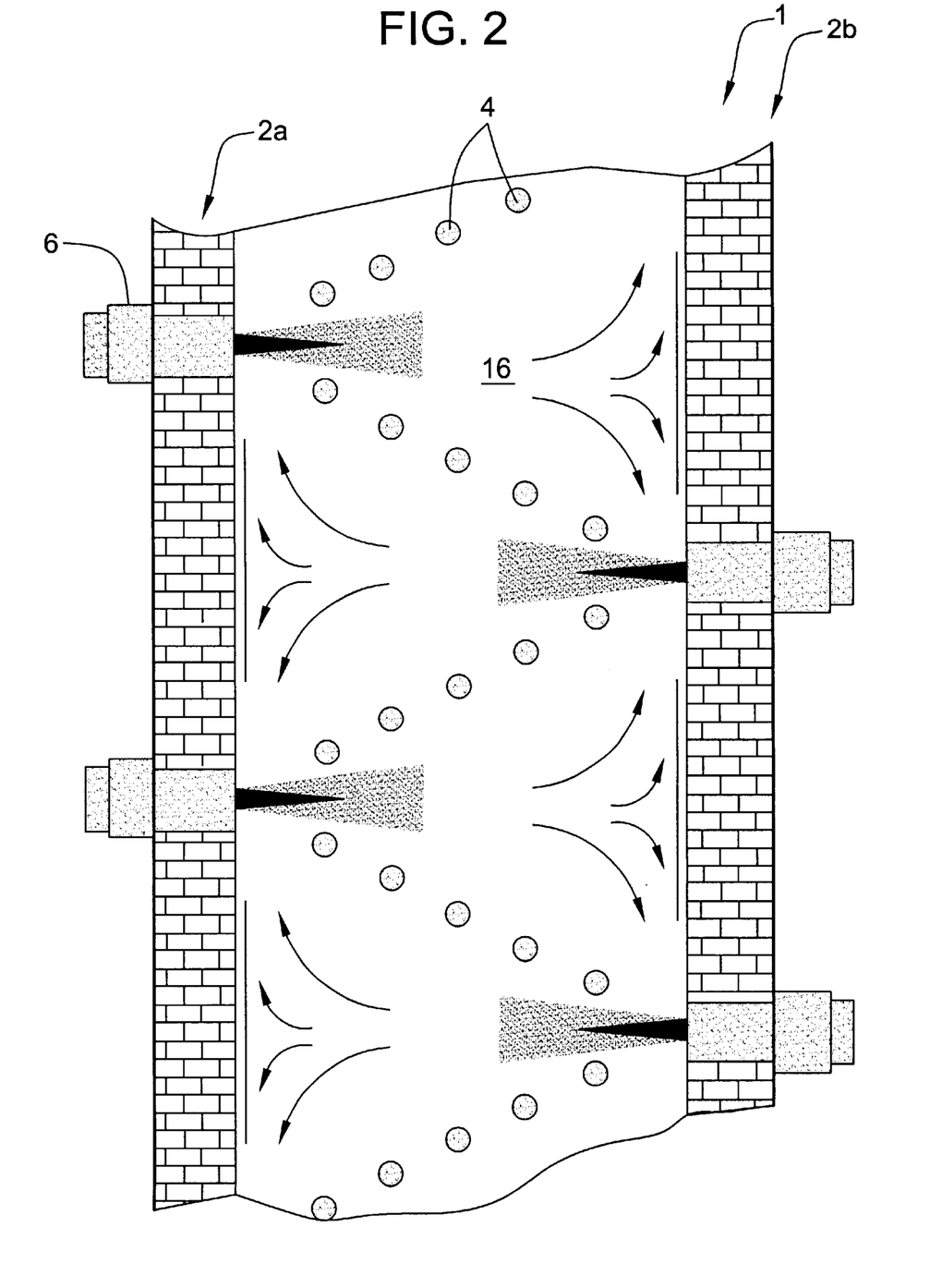
FIG. 2 is a horizontal section, similar to FIG. 1, depicting a modified embodiment of a thermal processing plant according to the invention.

In FIG. 2, a modified embodiment of the thermal processing plant 1 according to the invention is illustrated. Instead of burners suitable for flameless oxidation, here there are burners 6 that generate a flame directed towards the opposite oven wall 2a, 2b. The zigzag arrangement of the lines of heating tubes 4 and the large area flow relations, however, are similar to those for the embodiment according to FIG. 1. Likewise, there can be additional burners 6', as indicated in FIG. 3.

Figure 4:
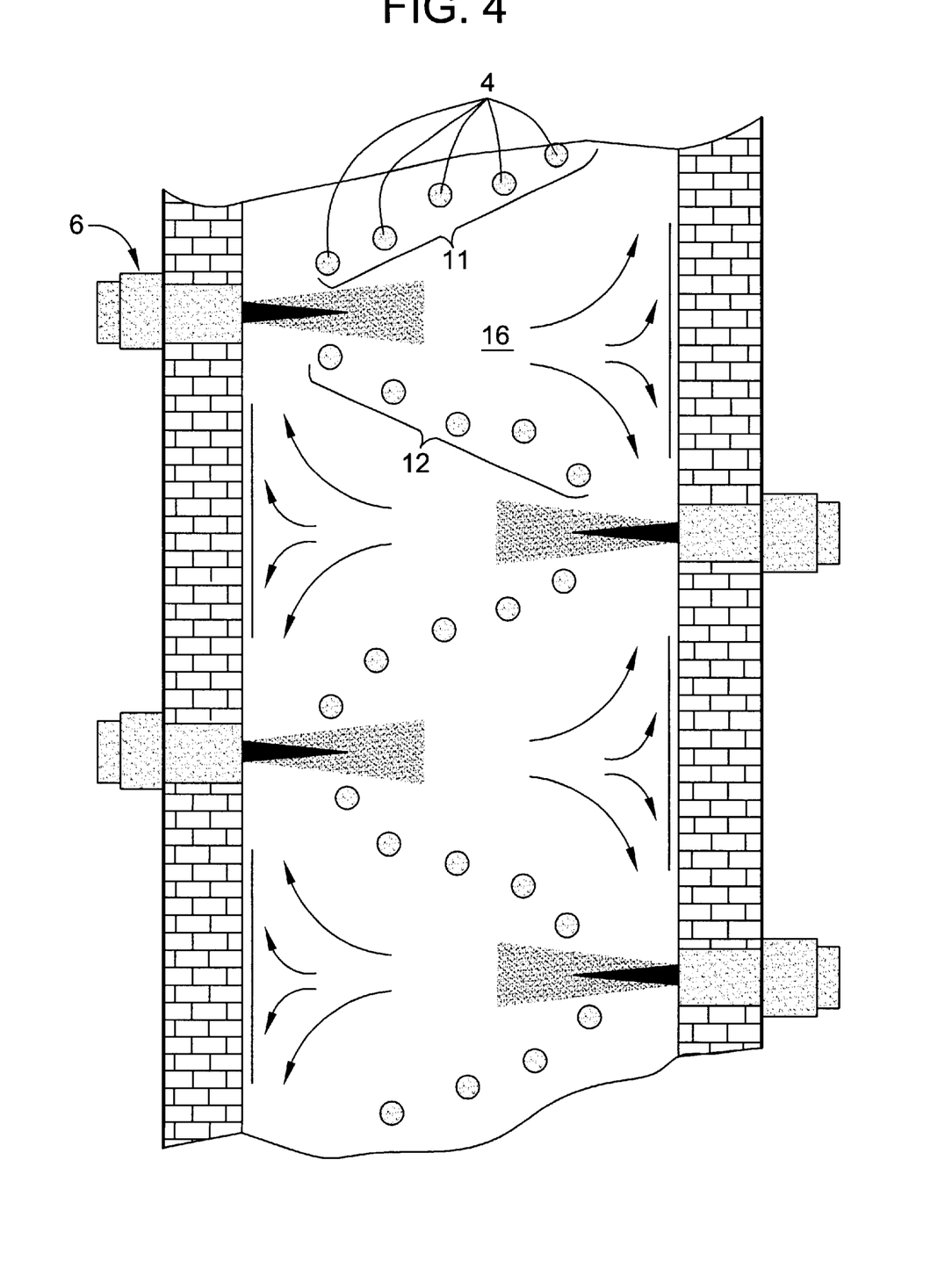
FIG. 4 is a horizontal section of still another alternative embodiment of thermal processing plant according to the present invention.

As FIG. 4 illustrates, it is also possible, both with burners with flames and also with flameless burners, to arrange the heating tubes 4 in an undulating line. In turn, this line also has sections that are formed of groups 11, 12 of heating tubes 4 and that are not directed parallel to each other. However, consistent with the embodiment according to FIGS. 1 and 2, the groups 11, 12 preferably have an equal number of heating tubes 4, wherein the intervals between the heating tubes 4 of group 11 and the heating tubes 4 of group 12 increase from the corresponding burner 6 up to the opposite oven wall. The increase in the interval does not have to be linear. Likewise, the intervals between the heating tubes 4 do not have to be equidistant.

Figure 5:
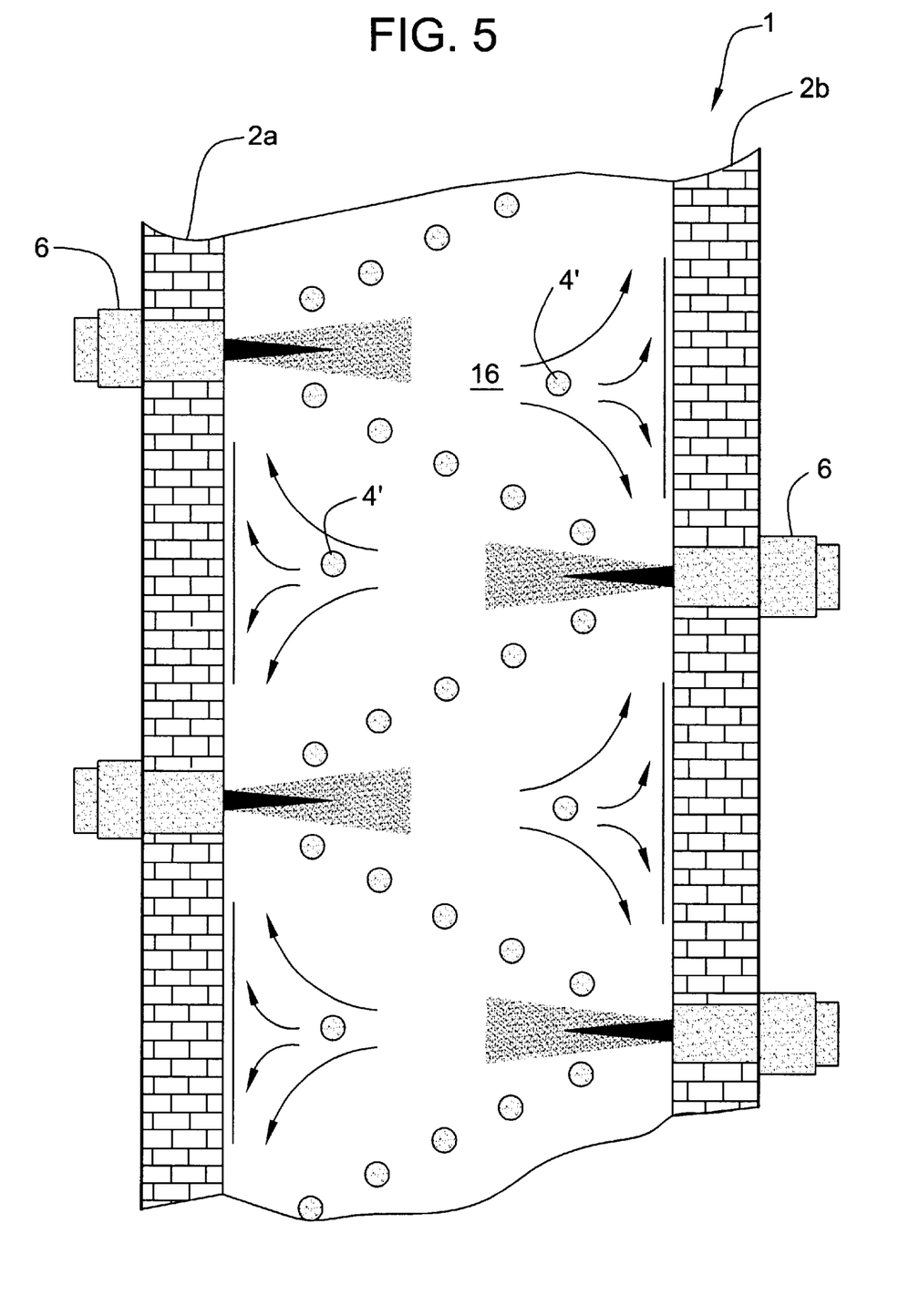
FIG. 5 is a horizontal section of another alternative embodiment of thermal processing plant according to the invention.

As FIG. 5 illustrates, if necessary, there can be additional heating tubes 4', which are used, e.g., as overheating tubes, which are directed to another processing step, or which are otherwise subjected to fundamentally different conditions than the heating tubes 4. However, the additional tubes 4' should be arranged so that they do not significantly influence the described operation of the thermal processing plant 1.

In this thermal processing plant 1 the heating tubes 4 again are arranged in an undulating line in an oven chamber. Burners which generate a gas stream directed against the opposite wall of the oven are positioned at each of the "wave crests" and in each of the "wave troughs." The thermal radiation of the oven wall and of the reaction zone (combustion heat) heats the heating tubes uniformly.

What is claimed is:

1. A heating system comprising:

a wall arrangement (2) that at least partially defines a heatable interior space (3), a plurality of heating tubes (4) disposed in said interior space (3) in parallel relation to each other for guiding a fluid to be heated;

a plurality of burners (6) for heating the interior space (3), said burners being arranged perpendicular to said heating tubes (4) for directing heat toward a respective section (21) of said wall arrangement (2) opposite each burner (6), and said heating tubes (4) being arranged in a line (10) that has at least two sections (11, 12) that each open up away from the burners (6).

2. The heating system of claim 1 in which said tubes are arranged at intervals to each on a zigzag line (10) that extends between two parallel walls (2a, 2b) of the wall arrangement (2).

3. The heating system of claim 1 in which said tubes are arranged at intervals each on a undulating line (10) that extends between two parallel walls (2a, 2b) of the wall arrangement (2).

4. The heating system of claim 1 in which burners are operable for directing a gas stream output, and said burners are aligned so that the gas stream output of each burner (6) is directed between two heating tubes (4) into a larger free region of the interior space (3).

5. The heating system of claim 1 in which a plurality of said burners (6) are arranged in groups (11 or 12) that are in lines parallel to each other.

6. The heating system of claim 1 including a plurality of burners (6") aligned parallel to the heating tubes (4).

7. The heating system of claim 1 in which said burners (6) each direct air and gas and include a device for pre-warming the air.

8. The heating system of claim 1 in which said burners (6) are arranged and operable for permitting flameless oxidation of fuel directed from the burners into the interior space (3).

9. The heating system of claim 1 in which said burners direct fuel and combustion air, and said burners are arranged to impart a predominantly axially output momentum to the fuel and air with minimum swirl to the fuel and combustion air directed into the interior space (3).

* * * * *

UNITED STATES PATENT AND TRADEMARK OFFICE
CERTIFICATE OF CORRECTION

PATENT NO. : 6,606,969 B2
DATED : August 19, 2003
INVENTOR(S) : Wunning

It is certified that error appears in the above-identified patent and that said Letters Patent is hereby corrected as shown below:

Title page,
Item [73], Assignee, "WSO Warmeprozesstechnik GmbH" should be -- WS-Wärmeprozesstechnik GmbH. --

Signed and Sealed this

Twenty-eighth Day of September, 2004

JON W. DUDAS
*Director of the United States Patent and Trademark Office*